United States Patent
Kim et al.

(10) Patent No.: US 9,612,777 B2
(45) Date of Patent: *Apr. 4, 2017

(54) PULL PRINTING METHOD, APPARATUS AND SYSTEM

(71) Applicant: SAMSUNG ELECTRONICS CO., LTD., Suwon-si, Gyeonggi-do (KR)

(72) Inventors: Jeong-ho Kim, Suwon-si (KR); Seung-soo Oak, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/163,321

(22) Filed: Jan. 24, 2014

(65) Prior Publication Data

US 2014/0368867 A1   Dec. 18, 2014

Related U.S. Application Data

(60) Provisional application No. 61/834,136, filed on Jun. 12, 2013.

(30) Foreign Application Priority Data

Jul. 16, 2013   (KR) ........................ 10-2013-0083583

(51) Int. Cl.
*G06F 3/12*   (2006.01)
*H04W 4/00*   (2009.01)
(Continued)

(52) U.S. Cl.
CPC ............ *G06F 3/1204* (2013.01); *G06F 3/122* (2013.01); *G06F 3/1226* (2013.01);
(Continued)

(58) Field of Classification Search
CPC .... G06F 3/1201; G06F 3/1202; G06F 3/1203; G06F 3/1204; G06F 3/1256; G06F 3/1257; G06F 3/1278; G06F 3/1292
See application file for complete search history.

(56) References Cited

U.S. PATENT DOCUMENTS 9,244,643 B2   1/2016   Shimazaki et al.
2002/0054345 A1   5/2002   Tomida et al.
(Continued)

FOREIGN PATENT DOCUMENTS

CA   2 772 906   10/2012
CN   101334718   12/2008
(Continued)

OTHER PUBLICATIONS

Extended European Search Report mailed Aug. 8, 2014 in related European Application No. 14170604.4.
(Continued)

*Primary Examiner* — Thomas D Lee
(74) *Attorney, Agent, or Firm* — Staas & Halsey LLP

(57) ABSTRACT

A pull printing method, apparatus and system are provided. The pull printing system includes a mobile terminal, a client that discovers the mobile terminal by using a phone number according to a print command of a user and transmits rendered print job data to the mobile terminal, and an image forming apparatus that, when connected to the mobile terminal, receives the print job data from the mobile terminal and performs printing.

13 Claims, 14 Drawing Sheets

(51) Int. Cl.
*H04L 29/06* (2006.01)
*H04W 12/06* (2009.01)
*H04W 12/08* (2009.01)

(52) U.S. Cl.
CPC .......... *G06F 3/1257* (2013.01); *G06F 3/1267* (2013.01); *G06F 3/1292* (2013.01); *H04L 63/107* (2013.01); *H04W 4/008* (2013.01); *H04W 12/06* (2013.01); *H04W 12/08* (2013.01); *G06F 3/1256* (2013.01); *G06F 3/1288* (2013.01)

(56) References Cited

U.S. PATENT DOCUMENTS

| | | | |
|---|---|---|---|
| 2007/0182984 A1* | 8/2007 | Ragnet et al. | 358/1.15 |
| 2011/0216349 A1* | 9/2011 | McCorkindale | G06F 15/00 358/1.15 |
| 2012/0050818 A1* | 3/2012 | Watanabe | 358/407 |
| 2012/0300242 A1* | 11/2012 | Meike | G06F 3/1219 358/1.13 |

FOREIGN PATENT DOCUMENTS

| | | |
|---|---|---|
| EP | 1462976 A2 | 9/2004 |
| EP | 2509286 A2 | 10/2012 |
| JP | 2004-46581 | 2/2004 |
| KR | 10-2007-0075691 | 7/2007 |
| KR | 10-2012-0064210 | 6/2012 |

OTHER PUBLICATIONS

Chinese Office Action issued on Dec. 28, 2016 in corresponding Chinese Patent Application No. 201410261684.0.

\* cited by examiner

1400

| Group | Device | Phone number | User | Pin code | MAC |
|---|---|---|---|---|---|
| Depart. A | MOBILE #1 | 123-### | John | ****** | 1A:32:44:## |
| | MOBILE #2 | 456-### | Paul | ****** | ##:##:##:## |
| | MOBILE #3 | ...... | ...... | ...... | ...... |
| Depart. B | MOBILE #4 | | | | |
| | MOBILE #5 | | | | |

PULL PRINTING METHOD, APPARATUS AND SYSTEM

CROSS-REFERENCE TO RELATED APPLICATIONS

This application is related to, and claims priority to, U.S. Provisional Patent Application No. 61/834,136, filed on Jun. 12, 2013, in the U.S. Patent and Trademark Office, and Korean Patent Application No. 10-2013-0083583, filed on Jul. 16, 2013, in the Korean Intellectual Property Office, the disclosures of which are incorporated herein by reference.

BACKGROUND

1. Field

Embodiments of the present invention relate to a method and apparatus for pull printing print job data of a client by using a mobile terminal.

2. Description of the Related Art

A pull printing system includes a multifunction printer (MFP), a client, and a server. Print job data generated by the client may be stored in the server, and the MFP connected to the server to read the print job data stored in the server and perform printing. As such, a technology used by the MFP to pull the print job data from the server and perform printing is known as pull printing. In a pull printing system, many users may share the print job data stored in the server and may output or re-output the print job data as desired.

Since a personal computer (PC) that may function as the server may need to be separately installed, maintained, and managed to establish the related-art pull printing system, it is difficult in terms of convenience and costs for small or medium-sized offices to install and operate a general printing system.

Since a user may need to authenticate, discover, and select the print job data in order to pull the print job data stored in the server to the MFP, it is complex and difficult for the user to manipulate the MFP. For example, when the related-art pull printing system includes a plurality of MFPs and an MFP manipulated by the user in order to pull the print job data breaks down, the user has to manipulate another MFP in order to pull the print job data from the another MFP.

Moreover, since the MFP may need to be connected to, and registered in, the server through a network in order to pull the print job data from the server, it is difficult to output the print job data when an MFP outside the network needs to be used.

SUMMARY

Additional aspects and/or advantages will be set forth in part in the description which follows and, in part, will be apparent from the description, or may be learned by practice of the invention.

According to an exemplary embodiment of the present invention, a server-less pull printing method and apparatus both using a mobile terminal are provided. According to an exemplary embodiment of the present invention, a pull printing system is provided that overcomes network constraints, increases a degree of use, and improves the convenience of a user who manipulates an image forming apparatus.

According to an aspect of the present invention, a method is provided of transmitting print job data of a client for pull printing, the method including providing a graphical user interface (GUI) for print setup in response to a print command; enabling a mobile terminal to be selected from among at least one output device that may be selected on the GUI; discovering the mobile terminal by using identification information of the mobile terminal, and transmitting the print job data based on a discovery result, wherein the method is performed by the client.

According to an aspect of the present invention, a pull printing method is provided using a mobile terminal, the pull printing method including receiving print job data of a client through a mobile server embedded in the mobile terminal, storing the print job data in a data area of the mobile server, and when connection between the mobile terminal and an image forming apparatus is established, selecting the print job data stored in the data area and transmitting the print job data to the image forming apparatus.

According to an aspect of the present invention, a pull printing method is provided using a mobile terminal, the pull printing method including discovering the mobile terminal corresponding to a phone number, wherein the discovering is performed by a client, when the discovering of the mobile terminal corresponding to the phone number fails, transmitting print job data to a relay server, wherein the transmitting is performed by the client, and providing the print job data to the mobile terminal by using a mobile communication network, an e-mail server, or a messenger server, wherein the providing is performed by the relay server, wherein when the mobile terminal is connected to an image forming apparatus, the mobile terminal prints the print job data obtained from the relay server by using the image forming apparatus.

According to an aspect of the present invention, a computer-readable recording medium is provided having embodied thereon a program for executing the method.

According to an aspect of the present invention, a client of transmitting print job data for pull printing is provided, the client including a communication unit that transmits/receives data in a wired or wireless manner, a user interface that provides a graphical user interface (GUI) for print setup in response to a print command, and enables a mobile terminal to be selected from among at least one output device that may be selected on the GUI, and a control unit that discovers the mobile terminal by using identification information of the mobile terminal, and controls the communication unit to transmit print job data based on a result of the discovery.

According to an aspect of the present invention, a pull printing system is provided including, a mobile terminal, a client that discovers the mobile terminal by using a phone number according to a print command of a user, and transmits rendered print job data to the mobile terminal, and an image forming apparatus that when connected to the mobile terminal, receives the print job data from the mobile terminal and performs printing.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1A:
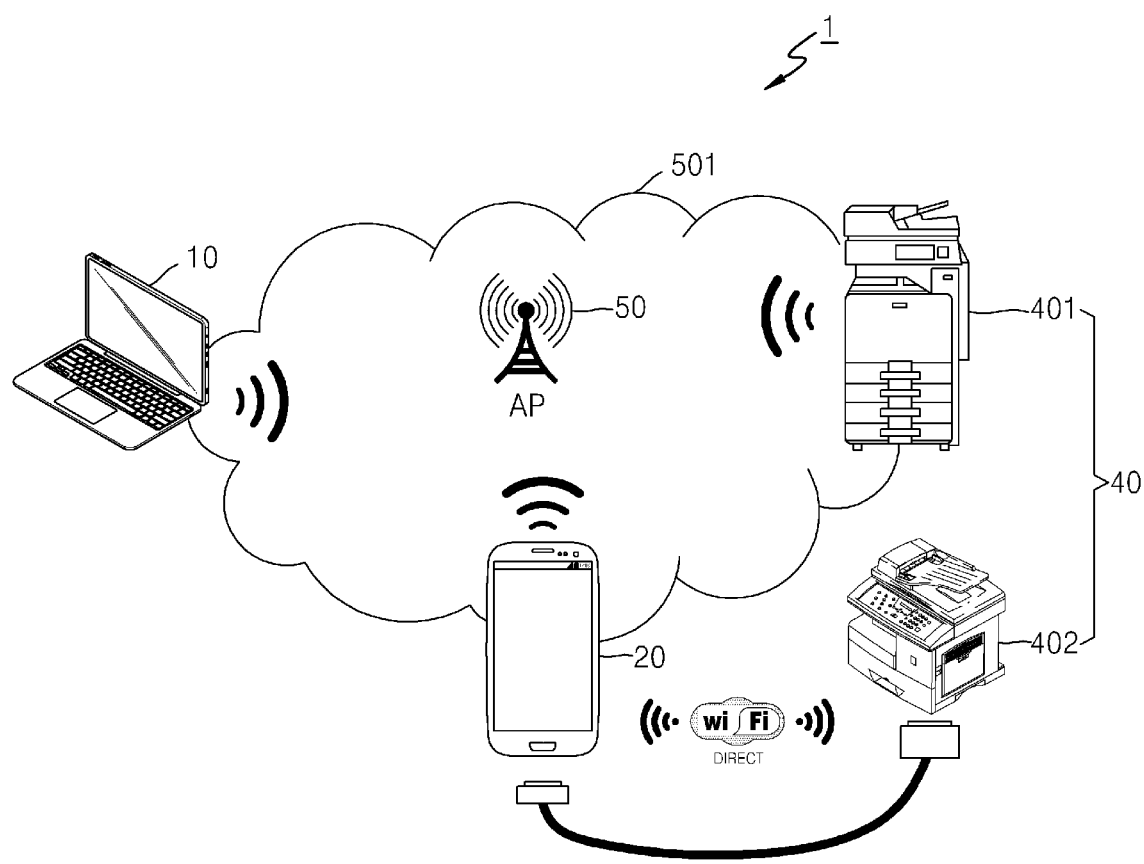
FIG. 1A is a view illustrating a pull printing environment according to an embodiment of the present invention.

Reference will now be made in detail to the embodiments, examples of which are illustrated in the accompanying drawings, wherein like reference numerals refer to the like elements throughout. The embodiments are described below to explain the present invention by referring to the figures.

The present invention is described with reference to the accompanying drawings, in which exemplary embodiments of the present invention are illustrated. Expressions such as "at least one of," when preceding a list of elements, modify the entire list of elements and do not modify the individual elements of the list. Examples of an image forming apparatus may include a printer, a scanner, a copier, a facsimile, or a multifunction printer (MFP). Print job data refers to a job performed by the image forming apparatus. Accordingly, the print job data is not limited to data for printing a document, and may refer to data for performing other jobs of the image forming apparatus, for example, data for scanning, copying, or faxing a document.

FIG. 1A is a view illustrating a pull printing environment 1 according to an embodiment of the present invention. Referring to FIG. 1A, the pull printing environment 1 includes a client 10, a mobile terminal 20, an image forming apparatus 40, and an access point (AP) 50. In the pull printing environment 1, since the mobile terminal 20 operates a mobile server in a network 501 of the AP 50, an additional pull printing server is not installed.

Since a pull printing server may be in a network, a client may access the pull printing server. Since both the pull printing server and the client may be based on a personal computer (PC), data transmission/reception is possible between the pull printing server and the client.

In the pull printing environment 1, the mobile terminal 20 may be used instead of the pull printing server. Thus, the mobile terminal 20 is used as the mobile server for pull printing on the network 501. However, mobility of the mobile terminal 20 should be preserved. Since the mobile terminal 20 is different from a PC, a new data transmission/reception procedure may be required between the mobile terminal 20 and the client 20.

Although the client 10 is a laptop in FIG. 1A, an exemplary embodiment is not limited thereto. Examples of the client 10 may include a desktop, a tablet PC, a personal digital assistant (PDA), and a smart phone. The client 10 receives a print command from a user, renders a document to be printed, and generates print job data. As the client 10 performs rendering, the print quality may be higher than that in the case when the mobile terminal 20 performs rendering.

Since the rendering engines for some word processor documents may be unknown, rendering the word processor documents in the mobile terminal 20 may be limited. When an original text and an original image included in a document are rendered in the mobile terminal 20, output quality is not reduced. However, specific graphic effects whose sources are unknown may not be obtained when the mobile terminal 20 performs rendering.

The document to be printed may be rendered by using various methods such as postscript (PS), XML paper specification (XPS), portable document format (PDF), printer control language (PCL), joint photographic experts group (JPEG), PRN, or universal print driver (UPD). All or some of the rendering methods may be supported by printers used to print the document. When the document to be printed is rendered by a method not supported by a printer, the document may not be printed. In this case, a printer driver may be used to render the document to be printed by using a previously known method.

When the client 10 performs rendering, the client 100 may not know in advance which printer will perform printing. Accordingly, the client 10 may perform rendering by using a general-purpose method or by using a plurality of methods. According to an exemplary embodiment, for example, the client 10 performs rendering by using a PDF method.

The print job data generated by the client 10 includes print setup data. The print setup data may include information, for example, the number of copies, a paper setup, a print direction, single/double-sided printing, or a print ratio.

Since a print job data is data generated in the middle of a print process for obtaining a final output matter, the print job data may be simultaneously generated and transmitted to a printer and is not provided to a user. Accordingly, the user may not obtain the print job data in the middle of the print process in the related art. Even when the print job data is obtained, the print job data may need to be transmitted to a mobile terminal, which is not used in a general print process. A user may have to manually connect the mobile terminal to a client through a data cable or the like, and manually copy the print job data into the mobile terminal. However, even when the print job data is successfully copied into the mobile terminal, the mobile terminal may not be able to use the print job data.

According to an exemplary embodiment, however, since the mobile terminal 20 may be registered as an output device in the client 10, when a user's print request is generated, the client 10 may automatically transmit the print job data to the mobile terminal 20. That is, the user may transmit the print job data of the client 10 to the mobile terminal 20 by using the same method as that used to transmit a general print command.

Various interfacing methods by which the client 10 transmits the print job data to the mobile terminal 20 may used.

Although the print job data is transmitted through the network 501 of the AP 50 in FIG. 1A, an exemplary embodiment is not limited thereto. For example, the client 10 and the mobile terminal 20 may be directly connected to each other by using an interfacing method such as WiFi-Direct, universal serial bus (USB), Bluetooth, near field communication (NFC), Zigbee, or W-USB. Alternatively, the above interfacing methods may be used to transmit the print job data according to priorities. For example, the client 10 may transmit the print job data through the network 501 by using a primary interfacing method, and when the primary interfacing method fails, the client 10 may transmit the print job data by using a secondary interfacing method, for example, WiFi-Direct. According to an exemplary embodiment of the present invention, for example, the print job data may be transmitted through the network 501.

The mobile terminal 20 stores the print job data received from the client 10. The mobile terminal 20 in which the print job data is stored transmits the print job data to the image forming apparatus 40 when the image forming apparatus 40 is connected to the mobile terminal 20. The image forming apparatus 40 may be any of an image forming apparatus 401 inside the network 501 and an image forming apparatus 402 outside the network 501. However, the print job data may only be output by the image forming apparatus 401 inside the network 501 according to an exemplary embodiment. For example, the mobile terminal 20 may transmit the print job data only to the image forming apparatus 401 inside the network 501 by using identification information of the image forming apparatus 40 such as an Internet protocol (IP) address or a media access control (MAC) address.

The mobile terminal 20 and the image forming apparatus 40 may be connected to each other in a wired and/or wireless manner. For example, the mobile terminal 20 and the image forming apparatus 40 may be connected to each other by using an interfacing method such as WiFi, WiFi-Direct, USB, Bluetooth, NFC, Zigbee, or W-USB. In FIG. 1A, when the image forming apparatus 40 is detected by using NFC tagging, the mobile terminal 20 may obtain information necessary to establish WiFi-Direct connection by using NFC. When the WiFi-Direct connection between the mobile terminal 20 and the image forming apparatus 40 is established, the mobile terminal 20 may transmit the print job data to the image forming apparatus 40 by using WiFi-Direct.

Figure 1B:
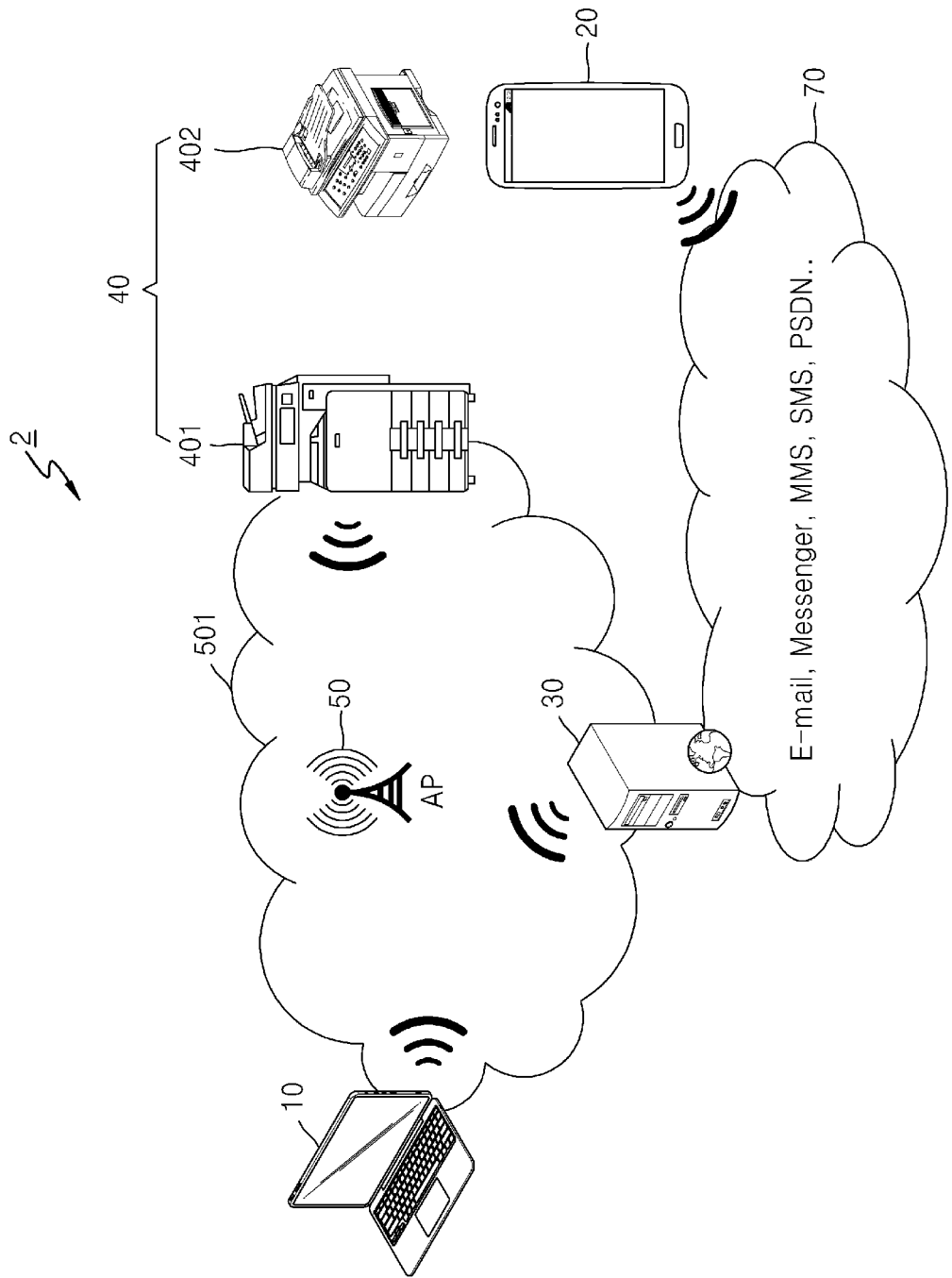
FIG. 1B is a view illustrating a pull printing environment according to an embodiment of the present invention.

FIG. 1B is a view illustrating a pull printing environment 2 according to an embodiment of the present invention. The pull printing environment 2 of FIG. 1B is different from the pull printing environment 1 of FIG. 1A in that the pull printing environment 2 further includes a relay server 30. The same elements as in FIG. 1A are denoted by the same reference numerals and a repeated explanation thereof is not given.

In the pull printing environment 2, the mobile terminal 20 is not in the network 501. Since the mobile terminal 20 is not discovered in the network 501, the client 10 may not transmit print job data to the mobile terminal 20 through the network 501. Since the client 10 and the mobile terminal 20 are separated from each other, the client 10 and the mobile terminal 20 may not be connected to each other by using an interfacing method such as WiFi-Direct, USB, Bluetooth, NFC, Zigbee, or W-USB.

The client 10 transmits the print job data to the relay server 30. In order to inform the relay server 30 that a destination of the print job data is the mobile terminal 20, the client 10 may transmit identification information of the mobile terminal 20 along with the print job data. A network address of the relay server 30 may be previously set in the client 10.

The relay server 30 transmits the print job data to the mobile terminal 20 through an external network 70 that is different from the network 501. The relay server 30 may use messenger, e-mail, or a mobile communication system to transmit the print job data.

The relay server 30 may be a messenger server or an e-mail server. When the relay server 30 is a messenger server or an e-mail server, the client 10 transmits the print job data to a messenger address or an e-mail address of the mobile terminal 20 which is already known. When the relay server 30 receives a message or an e-mail, the mobile terminal 20 downloads the print job data from the relay server 30 through the external network 70.

The relay server 30 may be a server that connects to a predetermined application installed in the mobile terminal 20. For example, the relay server 30 transmits a push message to the mobile terminal 20 through the predetermined application installed in the mobile terminal 20. The push message informs the mobile terminal 20 that the print job data has been received by the relay server 30. The mobile terminal 20 downloads the print job data from the relay server 30 by executing the predetermined application.

The relay server 30 may store a plurality of pieces of information such as a phone number, a MAC address, an e-mail address, and a messenger address of the mobile terminal 20 such that the at least two pieces of information are associated. For example, when the relay server 30 receives the phone number of the mobile terminal 20 and the print job data from the client 10, the relay server 30 obtains an e-mail address or a messenger address corresponding to the phone number of the mobile terminal 20. The relay server 30 transmits the print job data to the obtained e-mail address or message address. When both the e-mail address and the messenger address are associated with the phone number of the mobile terminal 20, the relay server 30 may transmit the print job data to both the e-mail address and the messenger address or may select one address and transmit the print job data to the selected address. Priorities may be previously assigned to the e-mail address and the messenger address.

Figure 2:
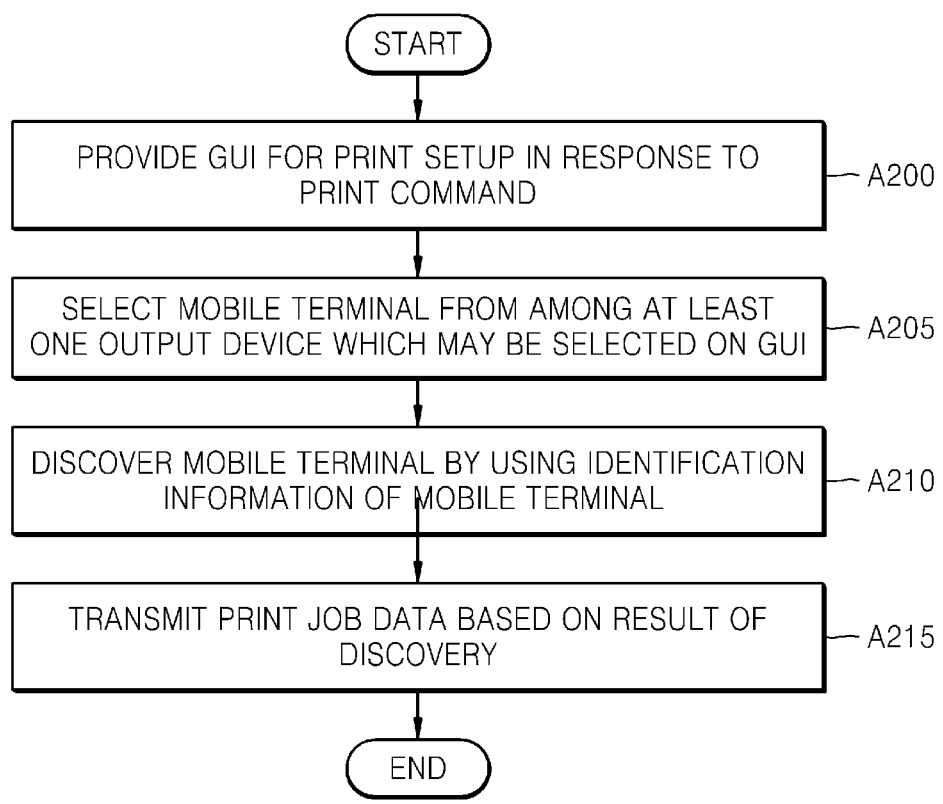
FIG. 2 is a flowchart illustrating a method of transmitting print job data of a client, according to an embodiment of the present invention.

FIG. 2 is a flowchart illustrating a method of transmitting print job data of the client 10, according to an embodiment of the present invention.

Figures 13, 14:
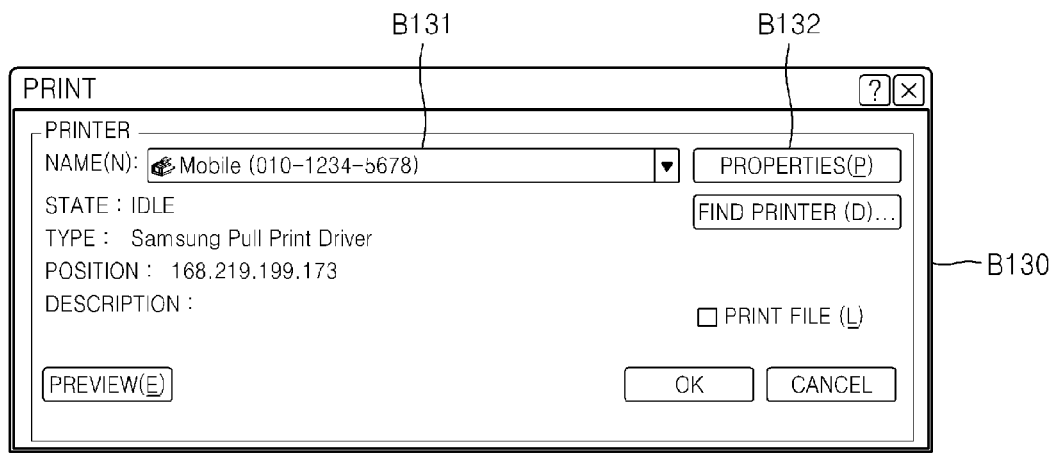
FIG. 14 is a view illustrating information about the mobile terminal, according to an embodiment of the present invention.

In operation A200, the client 10 provides a graphical user interface (GUI) for print setup in response to a print command. When the user requests the client 10 for printing, the client 10 displays the GUI for setting an output device, a print ratio, a printed page, or the number of copies. For example, the client 10 displays a GUI B130 (see, for example, FIG. 13). Although setting items such as a print ratio, a printed page, and the number of copies is illustrated in FIG. 13, the setting items may be included in the GUI B130 according to an embodiment of the present invention. Although the GUI B130 for print setup is displayed in FIG. 2, it will be understood by one of ordinary skill in the art that any type of GUI capable of selecting or setting an output device may be used in an embodiment of the present invention. When the mobile terminal 20 is set as an output device in advance, operations A200 and A205 may be omitted and the mobile terminal 20 may be directly discovered according to a print command.

In operation A205, the client 10 allows the mobile terminal 20 to be selected from among at least one output device that may be selected on the GUI. A list of output devices registered in the client 10 may be displayed as a pull down menu B131 in the GUI B130. The client 10 selects the mobile terminal 20 in the pull down menu B131. The client 10 may select the mobile terminal 20 by using a phone number of the mobile terminal 20. That is, the client 10 may select the mobile terminal 20 by selecting or directly inputting the phone number of the mobile terminal 20 displayed in the pull down menu B131.

Although the mobile terminal 20 is displayed as "Mobile (010-1234-5678)" in FIG. 2, the mobile terminal 20 may be displayed differently. For example, the mobile terminal 20 may be displayed by using at least one from among a user name, a phone number, and a model name of the mobile terminal 20. A phone number in the "Mobile (010-1234-5678)" may be modified. For example, the phone number "010-1234-5678" may be modified by using a properties button B132. When the phone number is modified, it may be understood that a receiving device of the print job data may have been changed.

In the list of the output devices displayed as the pull down menu B131, the phone number may not be specified and only "Mobile" may be displayed. That is, the term "Mobile" may refer to an arbitrary mobile terminal. Accordingly, when "Mobile device" is selected, it may indicate that an output method is selected, but it does not indicate that a device to actually receive print job data is specified. When the user selects the "Mobile" as an output device and presses an "OK" button, the client 10 displays a GUI (not shown) for receiving a phone number, and receives the phone number from the user. Alternatively, when the "Mobile" is selected as an output device, a phone number input window (not shown) in the GUI B130 may be activated. Although an exemplary method of selecting the mobile terminal 20 by using a phone number have been described in the above, the scope of the present invention is not limited thereto.

The client 10 may simultaneously select a plurality of mobile terminals. The print job data may be transmitted to each of the selected mobile terminals. The client 10 may select a group of mobile terminals in order to simultaneously select a plurality of mobile terminals. For example, as illustrated in FIG. 14, the client 10 may select "Depart. A" in order to simultaneously transmit the print job data to mobile devices #1, #2, and #3.

In operation A210, the client 10 discovers the mobile terminal 20 by using identification information of the mobile terminal 20. The identification information of the mobile terminal 20 may be previously set in the client 10 according to the user's input. The following example uses identification information of the mobile terminal 20 that is a phone number. However, a MAC address, an IP address, a device name, or a Hash value of the mobile terminal 20, as well as the phone number, may be used as the identification information of the mobile terminal 20.

The client 10 broadcasts a discovery message including a phone number to the network 501 to discover the mobile terminal 20. When the mobile terminal 20 operates the mobile server in the network 501, the discovery message of the client 10 is received by the mobile terminal 20. The mobile terminal 20 determines whether the phone number included in the discovery message is identical to the phone number of the mobile terminal 20, and when it is determined that the phone numbers are identical to each other, the mobile terminal 20 transmits a response message including an authentication code to the client 10. That is, when the phone number included in the discovery message is identical to the phone number of the mobile terminal 20, the client 10 receives the response message including the authentication code from the mobile terminal 20.

Alternatively, the client 10 may discover the mobile terminal 20 by using an interfacing method such as WiFi-Direct, Bluetooth, NFC, Zigbee, or W-USB. The client 10 determines whether the mobile terminal 20 exists within the coverage of the client 10.

In operation A215, the client 10 transmits the print job data based on a result of the discovery performed in operation A210. When the mobile terminal 20 is discovered in operation A210, the mobile terminal 20 operates the mobile server in the network 501 and the mobile terminal 20 transmits a response message. When the mobile terminal 20 is discovered in operation A210, the client 10 transmits the print job data to the mobile terminal 20.

When the mobile terminal 20 is not discovered in operation A210, the client 10 transmits the print job data to a predetermined network address. In this case, identification information of the mobile terminal 20 may be transmitted to the predetermined network address along with the print job data. The predetermined network address refers to an address for transmitting the print job data to the mobile terminal 20 through the external network 70 that is different from the network 501. For example, the predetermined network address may be an address of the relay server 30 that relays the print job data to the mobile terminal 20 through a mobile communication network, an e-mail, or a messenger.

The print job data may be stored in the mobile server operated by the mobile terminal 20 and may be printed by the image forming apparatus 40 when the mobile terminal 20 is connected to the image forming apparatus 40.

Figure 3:
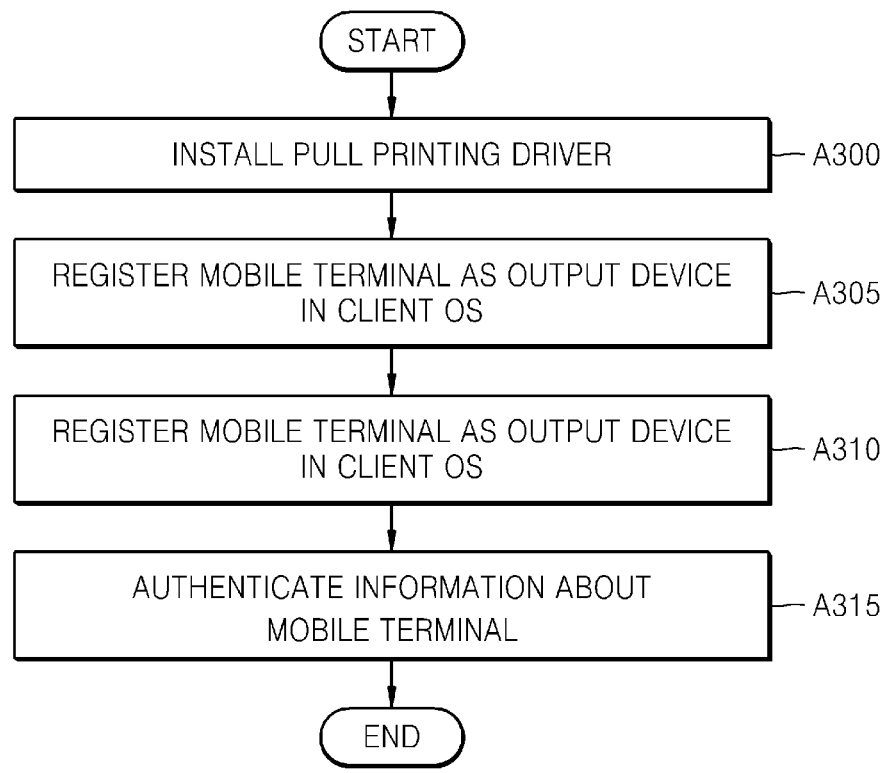
FIG. 3 is a flowchart illustrating a process of registering a mobile terminal in the client, according to an embodiment of the present invention.

FIG. 3 is a flowchart illustrating a process of registering the mobile terminal 20 in the client 10, according to an embodiment of the present invention. The mobile terminal 20 is not a device that is selected and displayed as an output device in the GUI B130 illustrated in FIG. 13. The mobile terminal 20, which is completely different from the image forming apparatus 40, is not registered as an output device in the client 10, although a mobile terminal driver that is provided by a manufacturer of the mobile terminal 20 may be installed in the client 10. In order to use the mobile terminal 20 as an output device in the client 10, a process of registering the mobile terminal 20 in the client 10 so that the client 10 recognizes the mobile terminal 20 as an output device may be necessary.

Referring to FIG. 3, in operation A300, the client 10 installs a pull printing driver. The pull printing driver refers to software that is installed in the client 10 to transmit print job data to the mobile terminal 20 according to a print command and perform pull printing by using the mobile terminal 20.

In operation A305, the client 10 registers the mobile terminal 20 as an output device therein as the pull printing driver is installed. That is, the client 10 may register a new output device in an operation system installed therein. Once the mobile terminal 20 is registered as a new output device in the operation system, all of application programs using a print application programming interface (API) of the operation system recognize the mobile terminal 20 registered in the operation system as an output device. Accordingly, when any of the application programs is used, a method of transmitting print job data according to the present invention may be used for general purposes.

In operation A305, an arbitrary terminal may be registered without being designated by using identification information, for example, a phone number. Alternatively, in operation A305, the client 10 may receive a phone number, designate the mobile terminal 20, and register the mobile terminal 20.

In operation A310, the client 10 inputs or modifies information about the registered mobile terminal 20. The information about the mobile terminal 20 may include information from among items illustrated in FIG. 14, for example, a group, a device name, a phone number, a user name, an authentication code (e.g., a PIN code), and a MAC address. Operation A310 may be omitted according to an embodiment of the present invention. For example, when the information about the mobile terminal 20 is already input in operation A305, operation A310 may be omitted.

In operation A315, the client 10 authenticates the input information about the mobile terminal 20. That is, in order to use only the authenticated mobile terminal 20 for security purposes, the client 10 may authenticate the information about the mobile terminal 20 and only when the information is authenticated, registration may be completed. Direct authentication on the mobile terminal 20, remote authentication using an external authentication server (not shown) or the relay server 30, or local authentication using the client 10 may be performed. When the information is authenticated, the registration of the mobile terminal 20 is completed and the mobile terminal 20 may be used as an output device.

Figure 12:
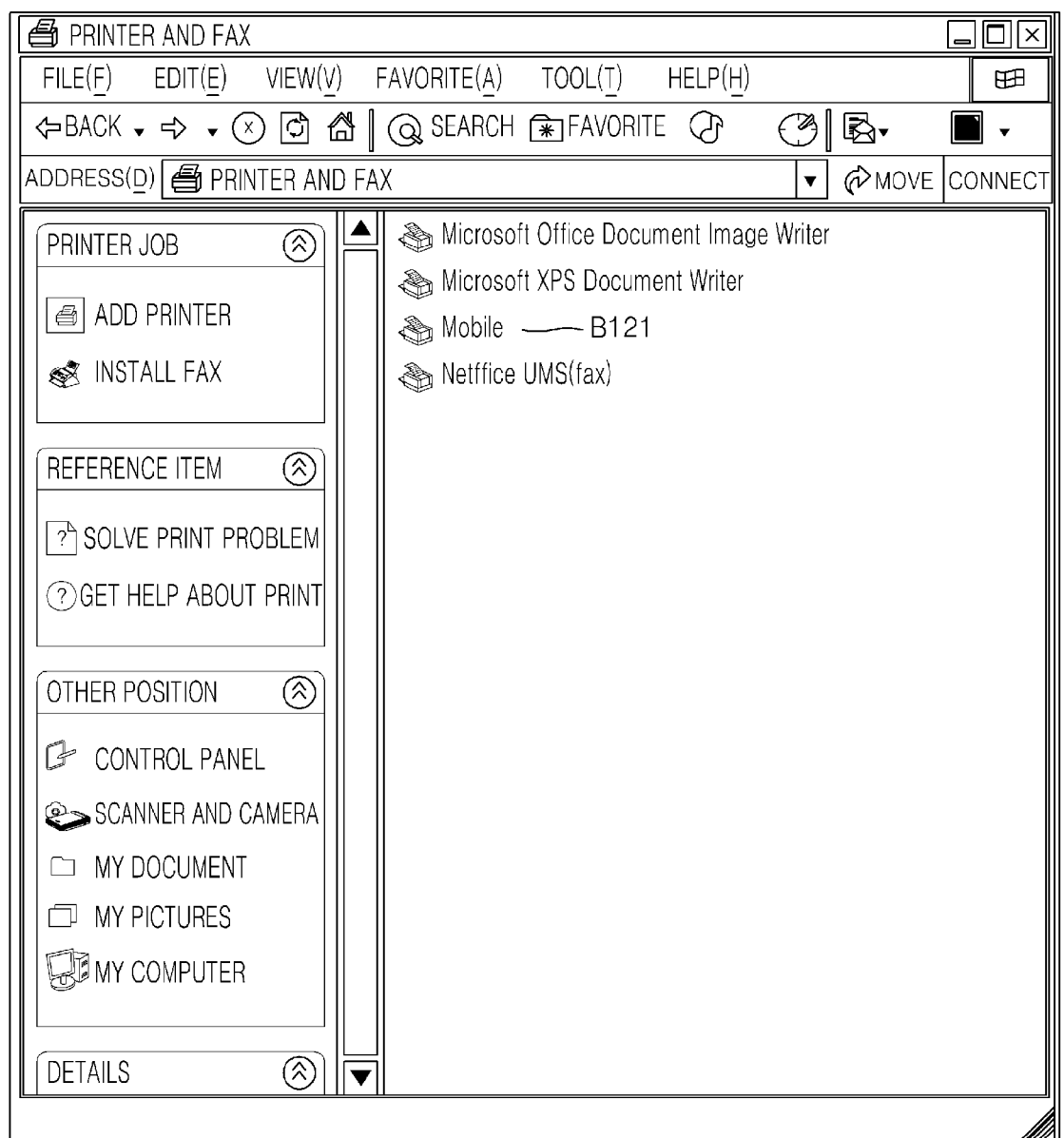
FIGS. 12 and 13 are views illustrating a graphical user interface (GUI) of the client, according to an embodiment of the present invention.

When the mobile terminal 20 is registered in the client 10, Mobile B121 may be displayed as an output device as illustrated in a GUI B120 of FIG. 12.

Figure 4:
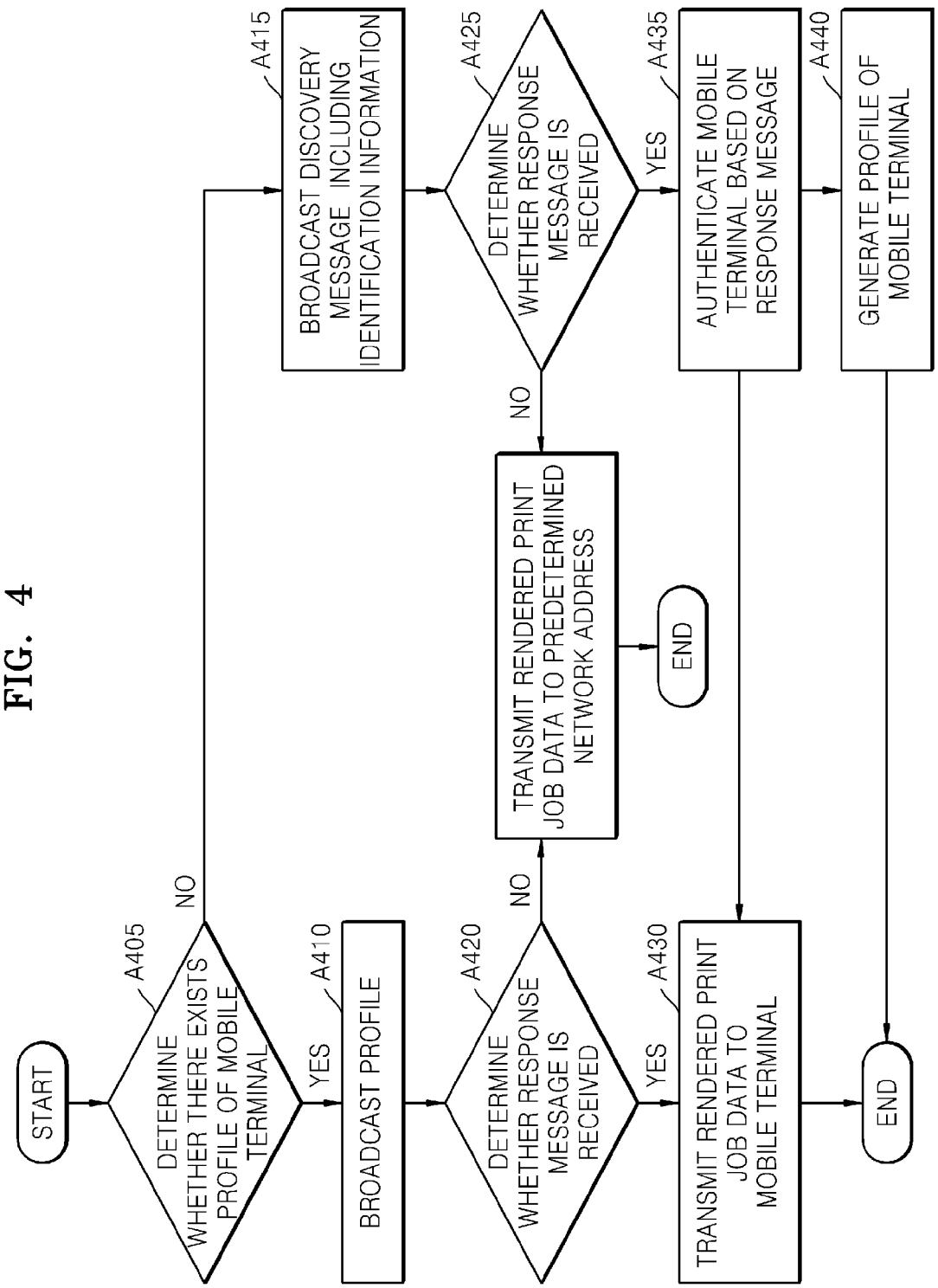
FIG. 4 is a flowchart illustrating a method of transmitting print job data of the client, according to an embodiment of the present invention.

FIG. 4 is a flowchart illustrating a method of transmitting print job data of the client 10, according to an embodiment of the present invention.

In operation A405, when the mobile terminal 20 is selected as an output device according to a print command, the client 10 determines whether a profile of the mobile terminal 20 exists in the client 10. The profile may include, but is not limited to, information about the mobile terminal 20, for example, a phone number and a MAC address of the mobile terminal 20.

According to an exemplary embodiment, the profile is generated when first connection between the mobile terminal 20 and the client succeeds. Accordingly, when the client 10 determines whether the profile of the mobile terminal 20 exists, it may be understood that it is determined whether the mobile terminal 20 has ever been connected to the client 10. Since the profile is generated when connection between the mobile terminal 20 and the client succeeds, the profile is different from information which the user manually inputs.

When it is determined in operation A405 that the profile does not exist, the method proceeds to operation A415. In operation A415, the client 10 broadcasts to the network 501 a discovery message including identification information, for example, a phone number. When the identification information corresponds to the mobile terminal 20, for example, when the phone number included in the discovery message is identical to a phone number of the mobile terminal 20, the mobile terminal 20 transmits a response message to the client 10. Information for connecting the client 10 and the mobile terminal 20 may be included in the response message. For example, a network address for accessing the mobile server operated by the mobile terminal 20 or a MAC address of the mobile terminal 20 may be included in the response message. An authentication code (e.g., a PIN code) for authenticating the mobile terminal 20 may be included in the response message.

In operation A435, the client 10 authenticates the mobile terminal 20 by using the received authentication code. Accordingly, the client 10 may prevent the print job data from being intercepted in response to a malicious command of an authenticated device. When the mobile terminal 20 is authenticated, in operation A430, the client 10 transmits the rendered print job data to the mobile terminal 20. In operation A440, the client 10 generates the profile of the mobile terminal 20.

When it is determined in operation A425 that the response message is not received, that is, when there is a timeout after the discovery message is broadcast, the client 10 determines that the mobile terminal 20 fails to be discovered. In operation A445, the client 10 failing to discover the mobile terminal 20 transmits the print job data to a predetermined network address. The predetermined network address may be an address for transmitting the print job data to the mobile terminal 20 by using a mobile communication network, an e-mail, or a messenger.

When it is determined in operation A405 that the profile of the mobile terminal 20 exists, the method proceeds to operation A410. In operation A410, the client 10 broadcasts the profile to the network 501. Alternatively, instead of broadcasting the profile, the client 10 may request the AP 50 to directly transmit the discovery message to a device having a MAC address included in the profile.

In operation A420, the client 10 determines whether the response message is received from the mobile terminal 20. When it is determined in operation A420 that the response message is not received from the mobile terminal 20, the method proceeds to operation A445. In operation A445, the client 10 transmits the print job data to the predetermined network address. When it is determined in operation A420 that the response message is received from the mobile terminal 20, the method proceeds to operation A430. In operation A430, the client 10 transmits the rendered print job data to the mobile terminal 20. When the profile is used, authentication performed on the mobile terminal 20 may be omitted.

Figure 5:
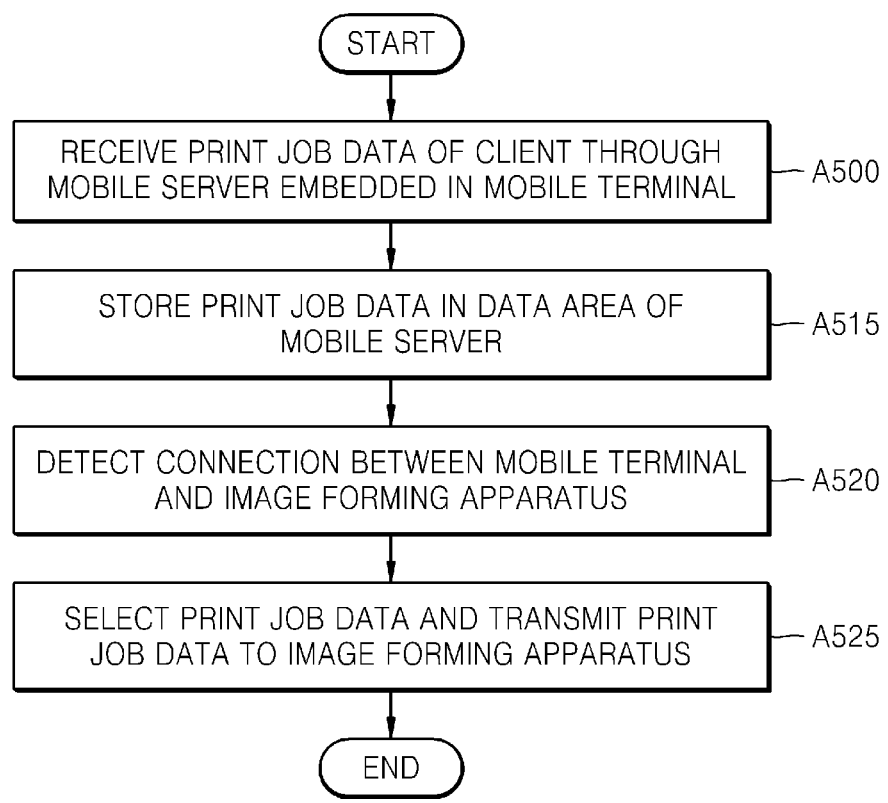
FIG. 5 is a flowchart illustrating a pull printing method using the mobile terminal, according to an embodiment of the present invention.

FIG. 5 is a flowchart illustrating a pull printing method using the mobile terminal 20, according to an embodiment of the present invention.

In operation A500, the mobile terminal 20 receives print job data of the client 10 via the mobile server embedded therein.

In operation A515, the mobile terminal 20 stores the print job data in a data area of the mobile server. The mobile terminal 20 may assign a part of a whole storage unit to the mobile server and may enable the print job data to be stored in the data area of the mobile server. The data area of the mobile server may be encrypted for security purposes. That is, the data area may be encrypted such that only when the mobile terminal 20 is authenticated by using an encryption key, the data area of the mobile server may be accessed.

When connection between the mobile terminal 20 and the image forming apparatus 40 is established, the method proceeds to operation A525. In operation A525, the mobile terminal 20 selects the print job data in the data area of the mobile server and transmits the print job data to the image forming apparatus 40. When connection with the image forming apparatus 40 is detected, the mobile terminal 20 may display a list of pieces of print job data which are stored in the data area of the mobile server. The mobile terminal 20 transmits the print job data selected by the user in the list of the pieces of print job data to the image forming apparatus 40. The image forming apparatus 40 receives the print job data and performs printing.

Figure 6:
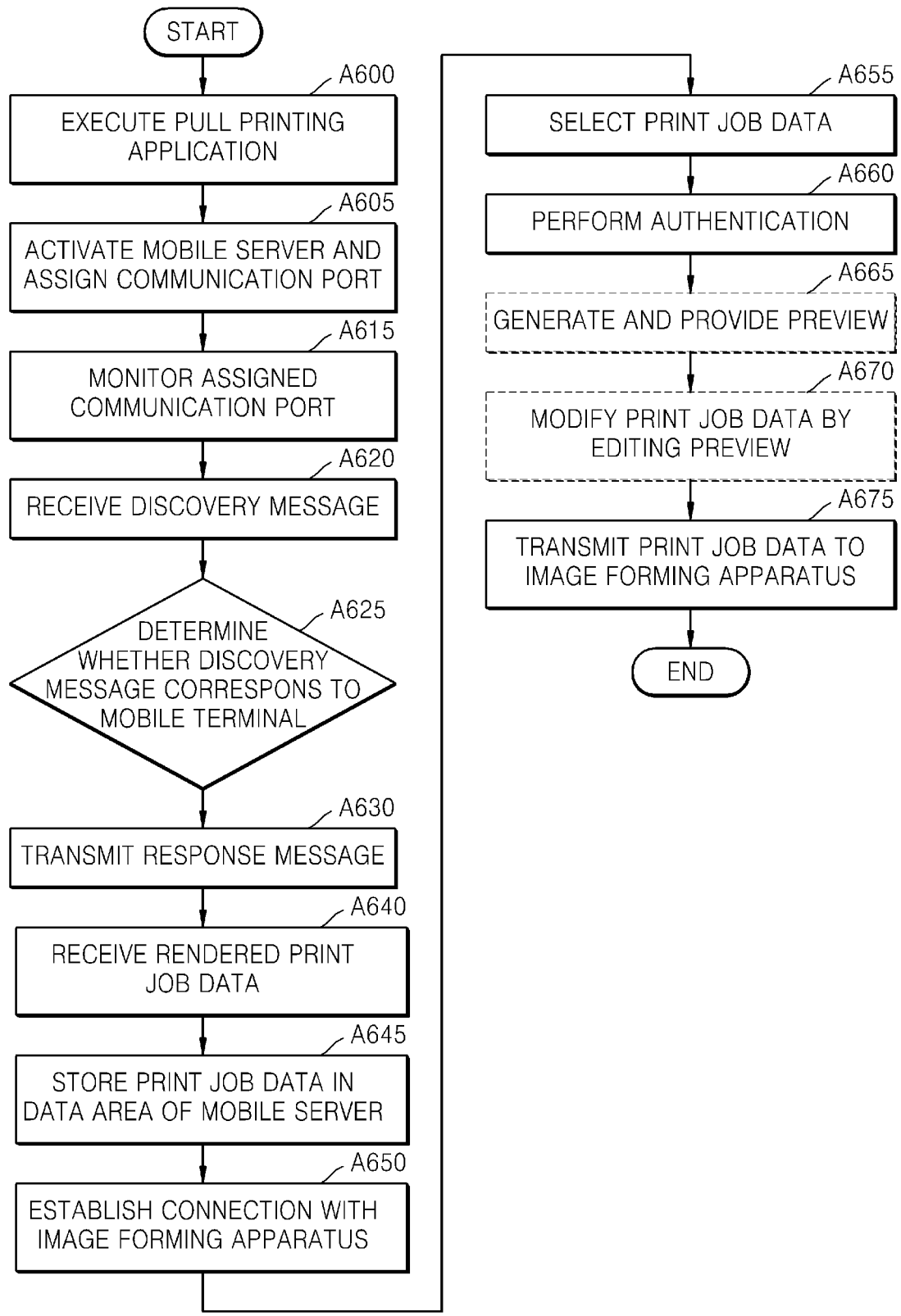
FIG. 6 is a flowchart illustrating a pull printing method using the mobile terminal, according to an embodiment of the present invention.

FIG. 6 is a flowchart illustrating a pull printing method using the mobile terminal 20, according to an embodiment of the present invention.

In operation A600, the mobile terminal 20 executes a pull printing application. The pull printing application refers to software for executing a pull printing method according to the present invention. The pull printing application may include a mobile server module. That is, a mobile server function of the mobile terminal 20 is included in the pull printing application.

In operation A605, the mobile terminal 20 actives the mobile server, and assigns at least one communication port to the mobile server. The mobile server may be embodied as any of various protocol servers such as a hypertext transfer protocol (HTTP) server or a file transfer protocol (FTP) server. A HTTP server may be used in consideration of intermittent access of the client 10, a resource of the mobile terminal 20, a size and a type of transmission data, and mobility, but an exemplary embodiment is not limited thereto.

The communication port assigned to the mobile server may be, but is not limited to, a transmission control protocol/Internet protocol (TCP/IP) port. When the mobile server is activated, the data area is assigned to the mobile server. According to the pull printing application, the mobile server may be activated or inactivated according to the user's settings. When a mobile application is initially executed, the mobile server may be automatically activated. When the mobile terminal 20 is not connected to the network 501, the pull printing application may request for connection of the network 501 in order to operate the mobile server.

According to embodiments of the present invention, when a pull printing application termination command is generated, the mobile terminal 20 may terminate processes other than the mobile server from among processes of the pull printing application that is being executed. The mobile server is operated as a background of the mobile terminal 20. Accordingly, even after the mobile application terminates, the mobile terminal 20 may receive print job data by using the mobile server. When the print job data is received, the mobile terminal 20 provides to the user a notice indicating that the print job data has been received. The mobile server may be forcibly shut down. The pull printing application may inactivate the mobile server or forcibly terminate the mobile server that is being executed in the operation system of the mobile terminal 20.

In operation A615, the mobile terminal 20 monitors the communication port by using the mobile server. The mobile server may monitor, but is not limited to, a TCP/IP port assigned through a simple network management protocol (SNMP).

In operation A620, the mobile terminal 20 receives a discovery message transmitted by the client 10 through the communication port by using the mobile server.

In operation A625, the mobile terminal 20 determines whether the discovery message corresponds to the mobile terminal 20. The mobile terminal 20 determines whether identification information included in the discovery message, for example, a phone number, is identical to a phone number of the mobile terminal 20.

When it is determined in operation A625 that the discovery message corresponds to the mobile terminal 20, the method proceeds to operation A630. In operation A630, the mobile terminal 20 transmits a response message to the client 10. The response message may include at least one from among a MAC address, an IP address, and an authentication code (e.g., a PIN code) of the mobile terminal 20. The authentication code may be received from the user or may be previously set in the pull printing application.

In operation A640, the mobile terminal 20 receives the print job data transmitted by the client 10 through the mobile server. In operation A645, the mobile terminal 20 stores the received print job data in the data area of the mobile server.

In operation A650, the mobile terminal 20 establishes connection with the image forming apparatus 40 according to the user's request. In operation A655, the mobile terminal 20 selects the print job data stored in the data area of the mobile terminal 20 according to the user's input. The mobile terminal 20 may request the user for an encryption key in order to access the data area of the mobile server.

When the print job data is encrypted in addition to the encryption of the data area, the method proceeds to operation A660. In operation A660, the mobile terminal 20 receives the encryption key from the user in order to use the selected print job data and may perform authentication. The encryption of the data area of the mobile server and the encryption of the print job data may be selectively performed.

In operation A665, the mobile terminal 20 generates and provides a preview of the print job data. The preview may be provided according to the user's request. A rendered document to be printed and print setup data may be included in the print job data. The preview may be generated by referring to information such as a printed page, the number of copies, single/double-sided printing, a print ratio, or black and white or color printing of the print setup data.

In operation A670, the mobile terminal 20 modifies the print job data by editing the preview according to the user's request. The mobile terminal 20 directly edits the print job data instead of editing an original document to be printed. According to the editing, the print setup data such as a printed page, the number of copies, single/double-sided printing, a print ratio, or black and white or color printing may be modified.

In operation A675, the mobile terminal 20 establishes connection with the image forming apparatus 40 according to the user's request, and transmits the print job data to the image forming apparatus 40.

Figure 7:
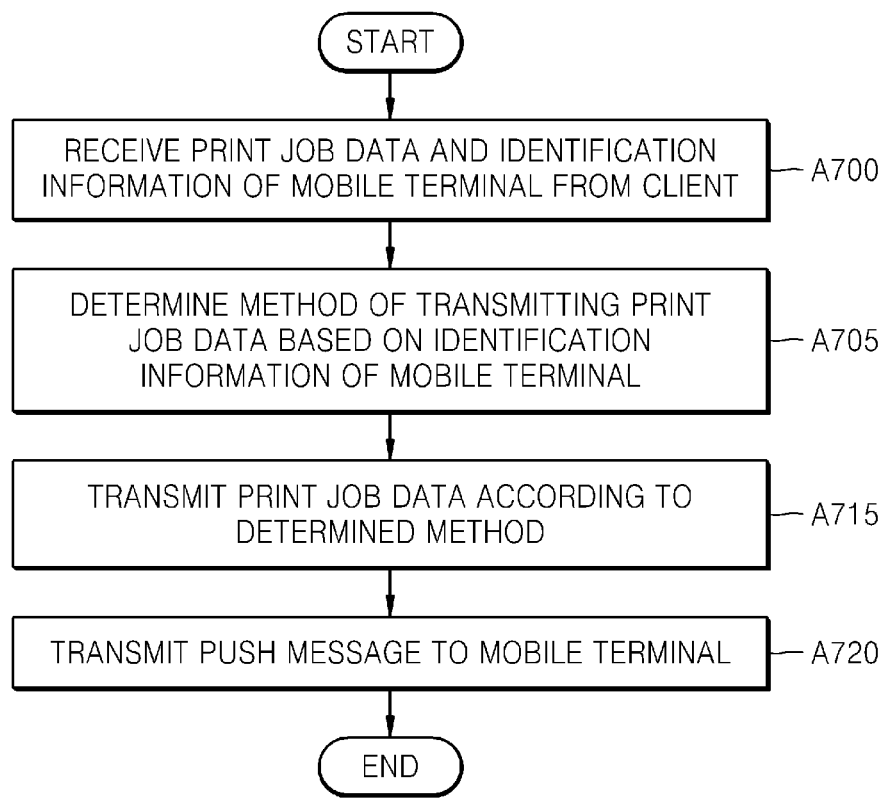
FIG. 7 is a flowchart illustrating a method performed by a relay server to relay print job data to the mobile terminal, according to an embodiment of the present invention.

FIG. 7 is a flowchart illustrating a method performed by the relay server 30 to relay print job data to the mobile terminal 20, according to an embodiment of the present invention.

Referring to FIG. 7, in operation A700, the relay server 30 receives print job data and identification information of the mobile terminal 20 from the client 10. The client 10 may transmit a phone number as the identification information of the mobile terminal 20, or when there is a profile, may transmit the profile as the identification information of the mobile terminal 20.

In operation A705, the relay server 30 determines a method of transmitting the print job data based on the identification information of the mobile terminal 20. Information about the mobile terminal 20 may be previously set in the relay server 30. For example, the relay server 30 may collect database information such as a phone number and a MAC address of the mobile terminal 20 and a messenger address and an e-mail address corresponding to the mobile terminal 20. When a phone number is received as the identification information of the mobile terminal 20, the relay server 30 obtains a messenger address and an e-mail address corresponding to the phone number. The relay server 30 may determine a method of transmitting the print job data based on the obtained information. According to embodiments, operation A705 may be omitted. For example, when the relay server 30 has only one transmission method, operation A705 may be omitted.

In operation A715, the relay server 30 transmits the print job data according to the determined transmission method. The relay server 30 may directly store the print job data, and may allow the print job data to be downloaded according to a request of the mobile terminal 20.

In operation A720, the relay server 30 transmits to the mobile terminal 20 a push message indicating that the print job data has been received. Accordingly, the mobile terminal 20 may know that the print job data has been received even when the pull printing application terminates.

Figure 8:
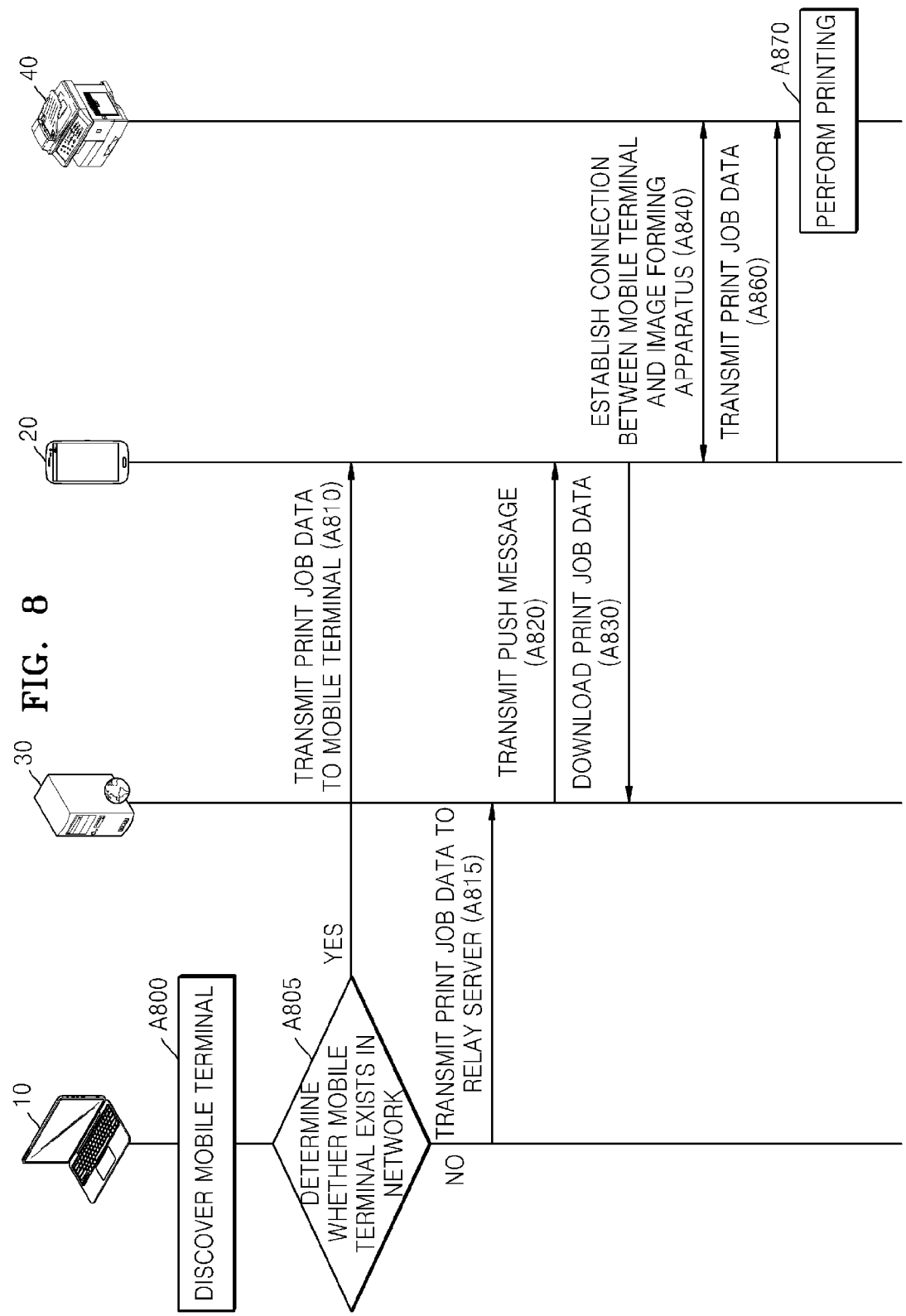
FIG. 8 is a flowchart illustrating a pull printing method in a pull printing environment, according to an embodiment of the present invention.

FIG. 8 is a flowchart illustrating a pull printing method performed in a pull printing environment, according to an embodiment of the present invention.

In operation A800, the client 10 discovers the mobile terminal 20 by using identification information of the mobile terminal 20 in the network 501.

In operation A805, the client 10 determines whether the mobile terminal 20 exists in the network 501 according to a result of the discovery.

When it is determined in operation A805 that the mobile terminal 20 exists in the network 501, the method proceeds to operation A810. In operation A810, the client 10 transmits rendered print job data to the mobile terminal 20 through the network 501.

When it is determined in operation A805 that the mobile terminal 20 does not exist in the network 501, the method proceeds to operation A815. In operation A815, the client 10 transmits the print job data to the relay server 30. In operation A820, the relay server 30 transmits a push message to the mobile terminal through the network 70 in order to inform the mobile terminal 20 that the print job data has been received. In operation A830, as the mobile terminal 20 knows that the print job data has been received from the push message, the mobile terminal 20 downloads the print job data from the relay server 30.

In operation A840, the mobile terminal 20 establishes connection with the image forming apparatus 40 according to the user's request. In operation A860, the mobile terminal 20 transmits the print job data to the image forming apparatus 40 through the connection with the image forming apparatus 40. In operation A870, the image forming apparatus 40 performs printing based on the print job data.

Figure 9:
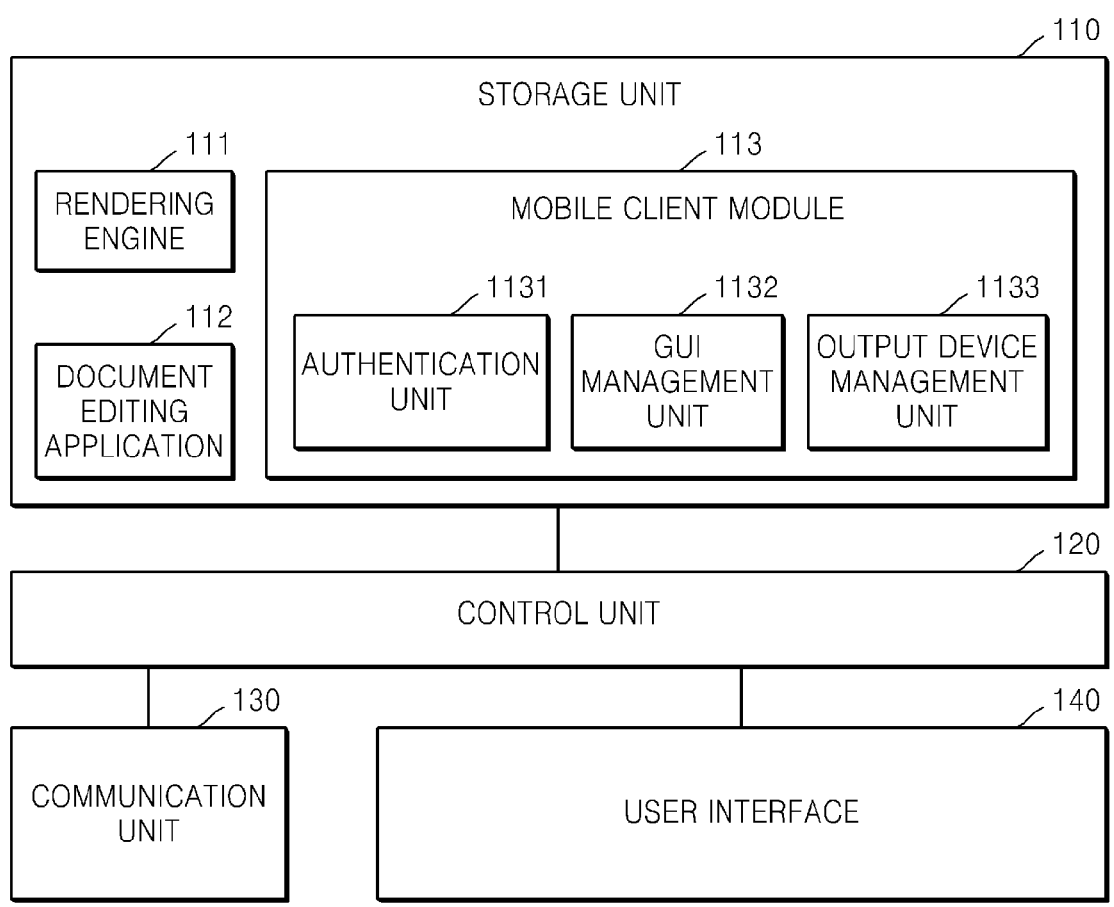
FIG. 9 is a block diagram illustrating the client according to an embodiment of the present invention.
Figure 10:
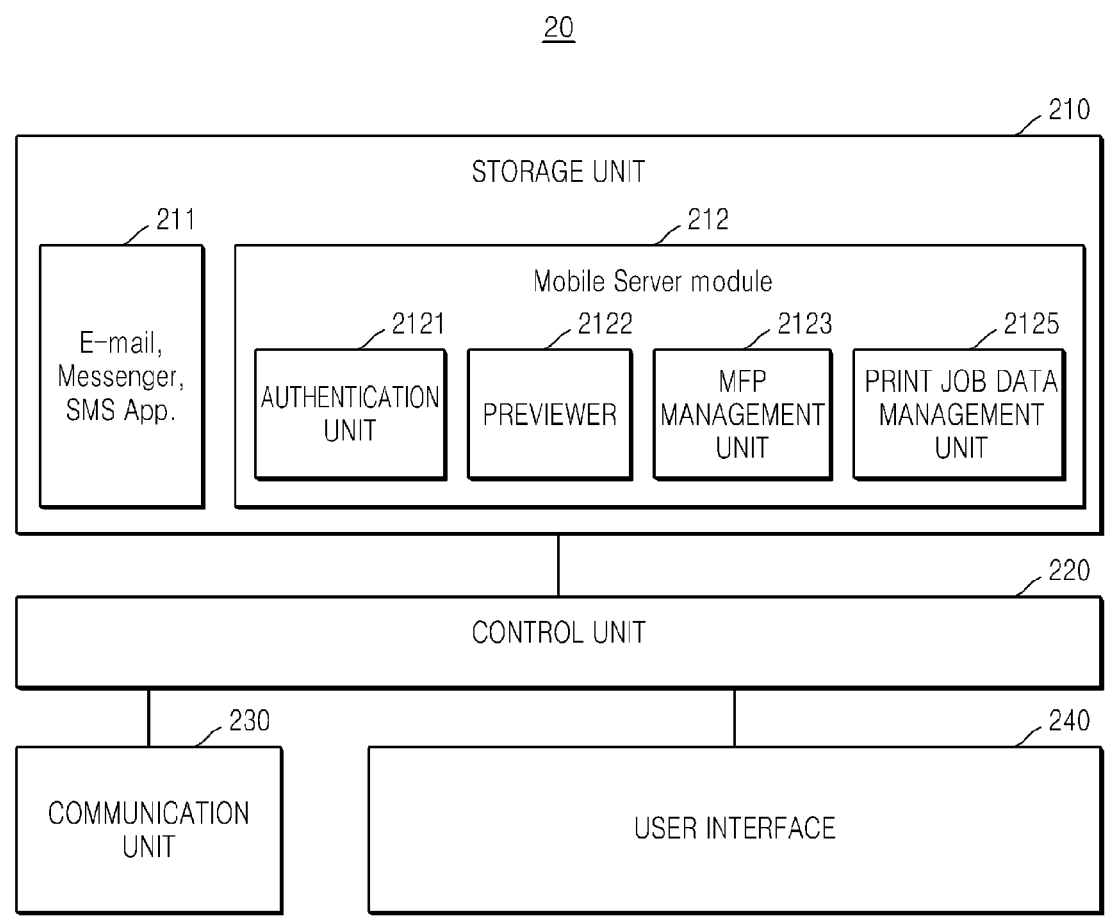
FIG. 10 is a block diagram illustrating the mobile terminal according to an embodiment of the present invention.
Figure 11:
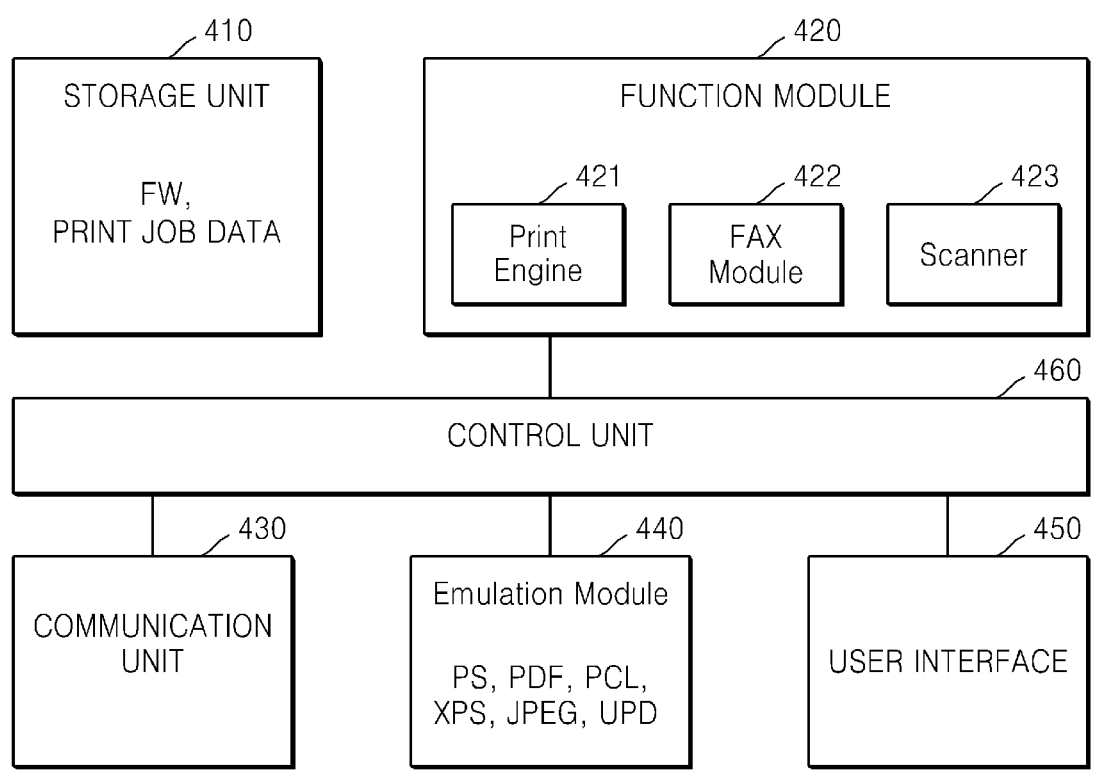
FIG. 11 is a block diagram illustrating an image forming apparatus according to an embodiment of the present invention.

FIGS. 9 through 11 are block diagrams illustrating exemplary embodiments of a client 10, a mobile terminal 20, and a image forming apparatus 40, according to embodiments of the present invention.

FIG. 9 is a block diagram illustrating the client 10 according to an embodiment of the present invention. The client 10 may further include general-purpose elements other than the illustrated elements.

Referring to FIG. 9, the client 10 includes a control unit 120, a communication unit 130, a user interface 140, and a storage unit 110.

The storage unit 110 may store processing and control programs to be executed by at least one processor of the control unit 120, and may store input/output data. A client operating system (OS) may be stored in the storage unit 110, and the control unit 120 includes at least one processor to control an overall operation of the client 10 by executing the client OS.

A rendering engine 111, a document editing application 112, and a mobile client module 113 may be included in the storage unit 110. FIG. 9 illustrates the elements in the storage unit 110 as functionally separated for convenience of explanation, but may not be necessarily independent program codes. Although the elements are stored in the storage unit 110 and are processed under the control of the control unit 120, operations of the elements may be understood as an operation of the control unit 120.

The control unit 120 reads and edits a document to be printed by executing the document editing application 112. When a print command is received from the user in a state where the document editing application 112 is being executed, the control unit 120 renders the document to be printed by using the rendering engine 111 and generates print job data.

The mobile client module 113 is installed in the storage unit 110 by using a pull printing driver. The control unit 120 discovers the mobile terminal 20 by executing the mobile client module 113, and controls the print job data to be transmitted based on a result of the discovery.

When a response message including an authentication code is received from the mobile terminal 20, the control unit 120 controls an authentication unit 1131 to authenticate the mobile terminal 20.

The control unit 120 generates and displays a GUI necessary to execute the mobile client module 113 by executing a GUI management unit 1132. For example, the GUI management unit 1132 is in charge of generating and outputting a GUI, for example, inputting a phone number or inputting information of the mobile terminal 20.

An output device management unit 1133 registers the mobile terminal 20 as an output device in the client 10. The output device management unit 1133 manages information about the mobile terminal 20 and generates a profile.

The storage unit may include at least one type of storage medium from among a flash memory type, a hard disk type, a multimedia card micro type, a card type memory (for example, a secure digital (SD) memory or an XD memory), a random access memory (RAM), a static RAM (SRAM), a read-only memory (ROM), an electrically erasable programmable read-only memory (EEPROM), a programmable ROM (PROM), a magnetic disk, and an optical disk. The client 10 may operate a web storage that performs a storage function of the storage unit 110 on the Internet.

The communication unit 130 includes a transmitter and a receiver to respectively transmit/receive data to/from the mobile terminal 20 and the relay server 30 in a wired or wireless manner. For example, the transmitter and the receiver of the communication unit 130 may use an interfacing method such as Ethernet, WiFi, WiFi-Direct, USB, Bluetooth, NFC, Zigbee, or W-USB to transmit/receive the data.

The user interface 140 displays the GUI for print setup in response to a print command, and enables the mobile terminal 20 to be selected from among at least one output device that may be selected on the GUI. The user interface 140 may enable the mobile terminal 20 to be selected by using a phone number of the mobile terminal 20.

The user interface 140 may include an interface for connecting a display device and a human interface device (HID). The user interface 140 may include an interface for enabling the user to manipulate the client 10 or displaying information processed by the client 10. The user interface 140 may be configured variously according to products. The user interface 140 may be configured simply to have 2 or 4 lines in a display device such as a liquid crystal display (LCD) device or a light-emitting diode (LED), or may be configured to include a GUI that provides various graphic effects. The user interface 140 may include a touch sensor for detecting the user's gesture.

The at least one processor of the control unit 130 discover the mobile terminal 20 by using identification information of the mobile terminal 20, and control the transmitter of the communication unit 130 to transmit the print job data based on a discovery result.

FIG. 10 is a block diagram illustrating the mobile terminal 20 according to an embodiment of the present invention. It will be understood by one of ordinary skill in the art that the mobile terminal 20 may further include general-purpose elements other than the illustrated elements. For example, the mobile terminal 20 may further include a general-purpose element such as a camera module, a digital multimedia broadcasting (DMB) module, a global positioning system (GPS) module, an image or voice processor, a power supply unit, a vibration motor, a speaker, a microphone, or a main board. The mobile terminal 20 may include more or less elements than the illustrated elements.

Referring to FIG. 10, the mobile terminal 20 includes a communication unit 230, a user interface 240, a control unit 220, and a storage unit 210.

The communication unit 230 transmits/receives data to/from the client 10 and the relay server 30 under the control of the control unit 220. For example, the communication unit 230 may use an interfacing method such as Ethernet, WiFi, WiFi-Direct, USB, Bluetooth, NFC, Zigbee, or W-USB. The communication unit 230 may further include a mobile communication module for mobile communication.

The user interface 240 may include an interface for enabling the user to manipulate the mobile terminal 20, or displaying information processed by the mobile terminal 20. The user interface 240 may be configured variously according to products. The user interface may be configured simply to have 2 or 4 lines in a display device such as an LCD or an LED, or may be configured to include a GUI that provides various graphic effects. The user interface 240 may include a touch sensor for detecting the user's gesture.

The storage unit 210 includes an application 211 such as an e-mail, a messenger, or a short message service (SMS). The mobile terminal 20 includes a mobile server module 212 for operating the mobile server. The mobile server module 212 includes an authentication unit 2121, a previewer 2122, an MFP management unit 2123, and a print job data management unit 2125. The authentication unit 2121 manages an authentication code to be included in a response message. The authentication unit 2121 performs authentication necessary to access a data area of the mobile server or use print job data. The previewer 2122 provides a preview and an editing function of the print job data. The MFP management unit 2123 establishes connection with the image forming apparatus 40, transmits the print job data to the image forming apparatus 40, and requests for printing. The print job data management unit 2125 stores and manages the print job data in the data area of the mobile server.

The control unit 220 controls an overall operation of the mobile terminal 20. The control unit 220 includes at least one processor to execute programs stored in the storage unit 210. Accordingly, operations of the elements of the storage unit 210 may be understood as an operation of the at least one processor of the control unit 220.

FIG. 11 is a block diagram illustrating the image forming apparatus 40 according to an embodiment of the present invention.

Referring to FIG. 11, the image forming apparatus 40 includes a storage unit 410, a function module 420, a control unit 460, a communication unit 430, an emulation module 440, and a user interface 450.

The function module 420 includes a print engine 421, a fax module 422, and a scanner 423 which respectively perform a printing function, a faxing function, and a document scanning and copying function.

The storage unit 410 stores print job data and firmware. A folder (hereinafter, referred to as a document box) generated according to a file server function of the image forming apparatus 40 may exist in the storage unit 410. The document box may include an individual box generated according to each user and a common box shared by all users.

Exemplary firmware is disclosed.

WLAN dongle firmware, which is wireless LAN firmware, may be stored in WLAN dongle hardware, and transmitted to a WLAN dongle from a printer main board during booting.

A STA host driver, which is a low level bus driver for communicating with wireless LAN hardware, may be a USB type, a secure digital input output (SDIO) type, or a serial peripheral interface (gSPI) type.

A WLAN control/data channel, which is a channel for communicating with wireless LAN firmware, is a layer corresponding to a communication class driver in the case of a USB interface.

A Wi-Fi Direct module is a module that performs WiFi Direct connection and gives an operation command to wireless LAN firmware.

A soft AP module is a software module functions as an AP.

A WPS module is a module that performs a Wi-Fi protected setup function.

A 802.11u generic advertisement service (GAS) module is a module that performs an IEEE 802.11u GAS.

A DHCP server module is a module that generates and assigns an IP address to a device connected to the image forming apparatus 40.

A Wi-Fi Direct UI module is a UI module that performs Wi-Fi Direct settings.

A Wi-Fi Direct connection manager is a module that manages a Wi-Fi Direct connection state of the image forming apparatus 40 and when the user inputs wireless LAN settings through a UI, and executes the wireless LAN settings.

A TCP/IP is a protocol stack for TCP/IP communication in an OS.

The user interface 450 is hardware that functions as a medium by which the user checks information of the image forming apparatus 40 and inputs a command to the image forming apparatus 40. The user interface 450 may be understood from the descriptions of the user interface of the mobile terminal 20 or the client 10. The user interface 450 may be embodied as a touch screen.

The control unit 460 controls an overall operation of the image forming apparatus 40, and information necessary for control is stored in the storage unit 410 and is read as needed.

The communication unit 430 transmits/receives data to/from the mobile terminal 20 under the control of the control unit 460. For example, the communication unit 430 may use an interfacing method such as Ethernet, WiFi, WiFi-Direct, USB, Bluetooth, NFC, Zigbee, or W-USB.

The emulation module 440 analyzes the print job data. The emulation module 440 and may include the following.

A PS module is a module that may analyze print job data generated in a PS language.

A PCL module is a module that may analyze print job data generated in a PCL.

An XPS module is a module that may analyze print job data generated in an Open XPS language;

A PDF module is a module that may read a PDF file and analyze the PDF file to enable the image forming apparatus 40 to output the PDF file.

A JPEG module is a module that may read a JPEG file and analyze the JPEG file to enable the image forming apparatus 40 to output the JPEG file.

A UPD module is a module that may analyze print job data generated in an HP UPD language.

The embodiments of the present invention may be written as computer programs and may be implemented in general-use digital computers that execute the programs using a computer readable recording medium. The present invention may be embodied in a general purpose digital computer by running a program from a computer-readable medium. Examples of the computer-readable medium include storage media such as magnetic storage media (e.g., ROMs), floppy discs, or hard discs), optically readable media (e.g., compact disk-read only memories (CD-ROMs), or digital versatile disks (DVDs)), etc.

While the present invention has been particularly shown and described with reference to exemplary embodiments thereof, it will be understood by those of ordinary skill in the art that various changes in form and details may be made therein without departing from the spirit and scope of the present invention as defined by the appended claims. The exemplary embodiments should be considered in descriptive sense only and not for purposes of limitation. Therefore, the scope of the present invention is defined not by the detailed description of the present invention but by the appended claims, and all differences within the scope will be construed as being included in the present invention.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of transmitting print job data of a client for pull printing, the method comprising:
   providing a graphical user interface (GUI) for print setup in response to a print command;
   enabling a mobile terminal to be selected from among at least one output device that may be selected on the GUI;
   using identification information of the mobile terminal to discover the mobile terminal;
   rendering the print job data; and
   transmitting the rendered print job data based on a result of the using identification information of the mobile terminal to discover the mobile terminal,
   wherein the method is performed by the client, and
   wherein the transmitting the rendered print job data comprises:
      when the mobile terminal is discovered, transmitting the rendered print job data to a mobile server embedded in the mobile terminal, and
      when the mobile terminal is not discovered, transmitting the rendered print job data and the identification information of the mobile terminal to a predetermined network address.

2. The method of claim 1, wherein the predetermined network address is an address for transmitting the rendered print job data to the mobile terminal by using a mobile communication network, e-mail, or messenger.

3. A pull printing method using a mobile terminal, the pull printing method comprising:
   receiving whole of print job data rendered by a client through a mobile server embedded in the mobile terminal;
   storing the print job data in a data area of the mobile server;
   when a connection between the mobile terminal and an image forming apparatus is established, displaying a list of a plurality of pieces of print job data that are stored in the data area of the mobile server, and
   upon a user selecting from the displayed list a piece of the print job data stored in the data area, transmitting the selected print job data to the image forming apparatus.

4. The pull printing method of claim 3, further comprising:
   activating the mobile server, and assigning at least one communication port to the mobile server;
   determining whether a discovery message detected by using the communication port corresponds to the mobile terminal; and
   transmitting a response message comprising an authentication code of the mobile terminal, according a determination result.

5. The pull printing method of claim 4, wherein the determining whether the discovery message corresponds to the mobile terminal comprises determining whether a phone number included in the discovery message is identical to a phone number of the mobile terminal.

6. The pull printing method of claim 3, wherein the print job data comprises print setup data and a document to be printed rendered by the client,
   wherein the pull printing method further comprises providing a preview of the rendered document to be printed based on the print setup data.

7. The pull printing method of claim 6, wherein the transmitting of the print job data and the providing of the preview are performed when the mobile terminal is authenticated by using a predetermined encryption key.

8. The pull printing method of claim 3, further comprising establishing a Bluetooth connection, a WiFi connection, a WiFi-Direct connection, a near field communication (NFC) connection, a wireless universal serial bus (W-USB) connection, or a USB connection between the mobile terminal and the image forming apparatus.

9. A client to transmit job data for pull printing, the client comprising:
   a communication unit including a transmitter and a receiver respectively configured to transmit/receive data in a wired or wireless manner;
   a user interface configured to provide a graphical user interface (GUI) for print setup in response to a print command, and to enable a mobile terminal to be selected from among at least one output device that may be selected on the GUI; and
   a control unit including at least one processor configured to execute at least one program to use identification information of the mobile terminal to discover the mobile terminal, render the print job data, and control the communication unit to transmit the rendered print job data based on a result of the use of the identification information discovery to discover the mobile terminal,
   wherein when the mobile terminal is discovered, the at least one processor of the control unit controls the transmitter of the communication unit to transmit the rendered print job data to a mobile server embedded in the mobile terminal, and
   when the mobile terminal is not discovered, the at least one processor of the control unit controls the transmitter of the communication unit to transmit the rendered print job data and the identification information of the mobile terminal to a predetermined network address.

10. A pull printing system comprising:
a client configured to provide a user interface for print setup according to a print command of a user, render print job data according to the print command, and transmit the rendered print job data to a mobile terminal discovered by the client; and
an image forming apparatus, that while connected to the mobile terminal discovered by the client, receives the rendered print job data forwarded by the mobile terminal and performs printing,
wherein, if the mobile terminal is not discovered by the client, the client transmits the rendered print job data and identification information of the mobile terminal to a predetermined network address.

11. The pull printing system of claim 10, wherein information regarding the mobile terminal is displayed on the user interface.

12. The pull printing system of claim 11, wherein if the mobile terminal is registered in the client, the displayed information on the user interface indicates the mobile terminal as an output device.

13. The pull printing system of claim 10, wherein the user interface displays a listing of a plurality of output devices selectable by the user, the plurality of output devices including the mobile terminal.

* * * * *